US 6,715,370 B2

(12) United States Patent
Tasca

(10) Patent No.: US 6,715,370 B2
(45) Date of Patent: Apr. 6, 2004

(54) METHOD OF INSPECTING DISTRICT HEATING PIPES

(75) Inventor: Jean-Pierre Tasca, Sainte Geneviere des Bois (FR)

(73) Assignee: Cegelec, Rueil Malmaison (FR)

( * ) Notice: Subject to any disclaimer, the term of this patent is extended or adjusted under 35 U.S.C. 154(b) by 0 days.

(21) Appl. No.: 10/352,915

(22) Filed: Jan. 29, 2003

(65) Prior Publication Data

US 2003/0150285 A1 Aug. 14, 2003

(30) Foreign Application Priority Data

Feb. 5, 2002 (FR) .............................. 02 01350

(51) Int. Cl.⁷ .......................... G01H 29/04; B08B 9/04
(52) U.S. Cl. ................ 73/865.8; 15/104.03; 15/104.04; 356/241.1
(58) Field of Search ............... 73/865.8; 15/104.03–10; 356/241.1

(56) References Cited

U.S. PATENT DOCUMENTS

| 2,940,302 A | | 6/1960 | Scherbatskoy ............. 73/40.57 |
|---|---|---|---|
| 3,593,749 A | * | 7/1971 | Reardon ...................... 138/93 |
| 3,837,214 A | * | 9/1974 | Guest ...................... 73/40.5 R |
| 4,077,080 A | * | 3/1978 | Ross ..................... 15/104.061 |
| 4,643,855 A | * | 2/1987 | Parkes et al. ............. 264/36.17 |
| 4,677,472 A | * | 6/1987 | Wood .......................... 348/84 |
| 5,084,764 A | * | 1/1992 | Day ........................... 348/84 |
| 5,364,473 A | * | 11/1994 | Van Der Does ................ 134/8 |
| 5,501,115 A | * | 3/1996 | Kamiyama et al. ......... 73/865.8 |
| 5,956,135 A | * | 9/1999 | Quesnel .................... 356/241.1 |
| 6,179,058 B1 | * | 1/2001 | Wittrisch .................... 166/384 |
| 6,533,626 B2 | * | 3/2003 | Pons .......................... 441/80 |
| 2002/0134178 A1 | * | 9/2002 | Knight et al. .............. 73/865.8 |

FOREIGN PATENT DOCUMENTS

| FR | 2667519 A | 4/1992 | ............ B08B/9/04 |
|---|---|---|---|
| WO | WO 97 24194 A | 7/1997 | ............ B08B/9/04 |
| WO | WO 97 42691 A | 11/1997 | ............ H02G/1/08 |
| WO | WO 98 57789 A | 12/1998 | ........... B29C/29/10 |

* cited by examiner

Primary Examiner—Hezron E. Williams
Assistant Examiner—David A. Rogers
(74) Attorney, Agent, or Firm—Sughrue Mion, PLLC

(57) ABSTRACT

A method of inspecting district heating pipes consists in introducing into the pipe a vehicle including an uninflated balloon and a pulley in which a cable is inserted. The vehicle is immobilized in the pipe by inflating the balloon. A sensor is moved in the pipe by fixing it to one end of the cable and pulling on the other end of the cable to move the sensor toward the immobilized vehicle in order to inspect the pipe. The vehicle includes a parachute and is propelled in the pipe by introducing into the pipe a fluid under pressure that acts on the parachute. The balloon is deflated when the sensor reaches the vehicle immobilized in the pipe. The vehicle and the sensor are withdrawn from the pipe by pulling on the end of the cable so that the inspection is carried out during the return travel of the vehicle and the sensor. With this method, the inspection can be carried out with access from only one end of the pipe.

16 Claims, 5 Drawing Sheets

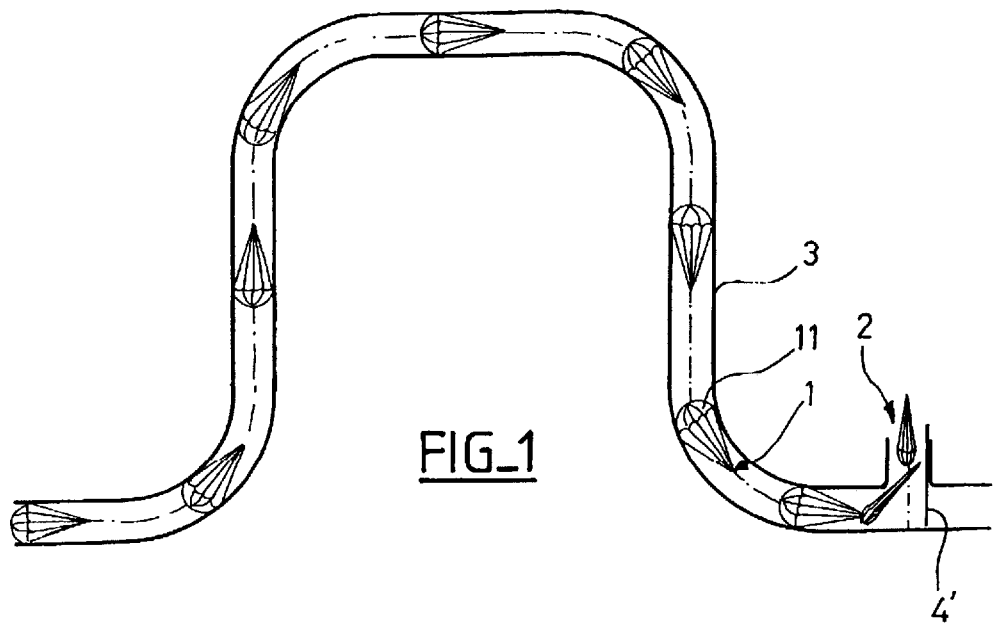
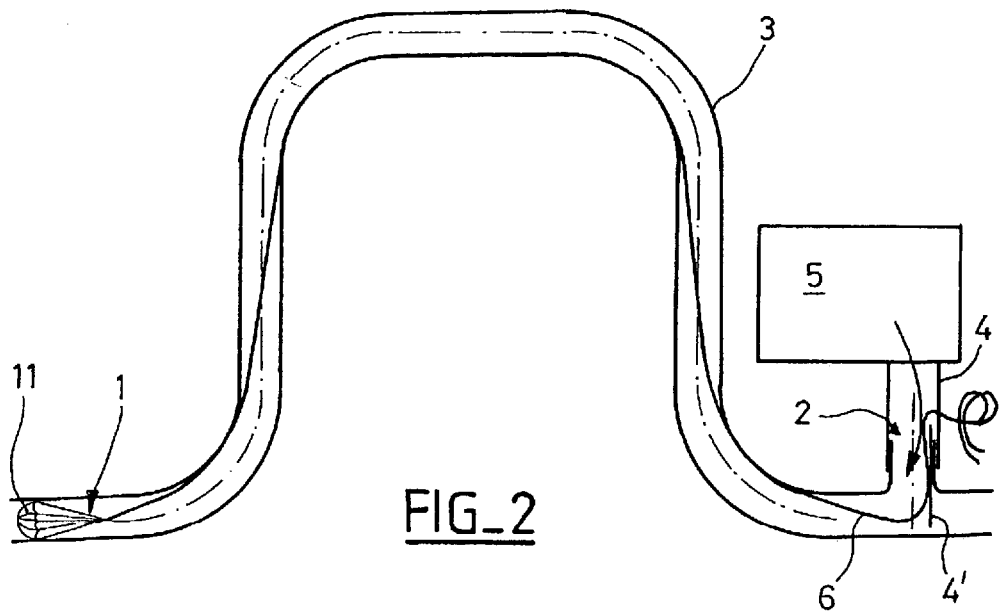

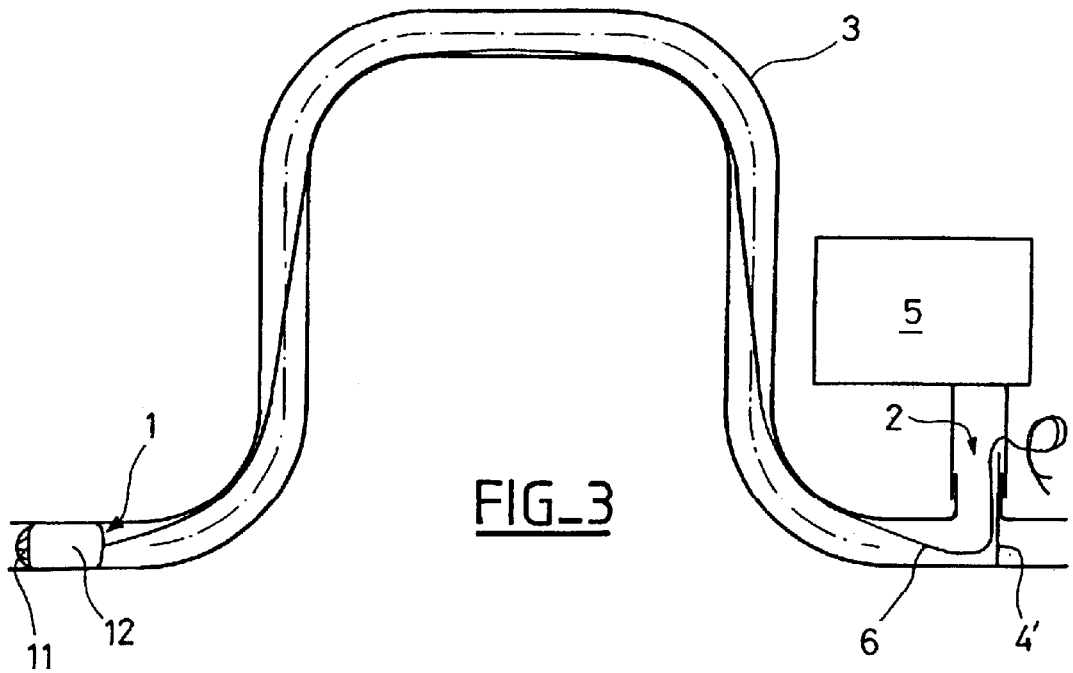
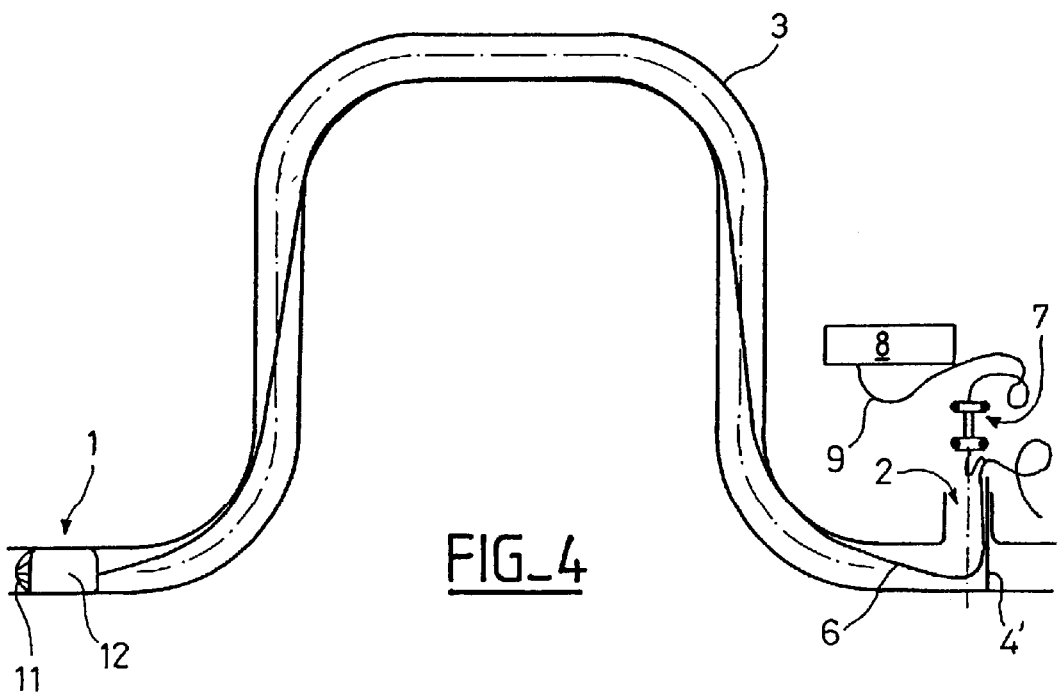

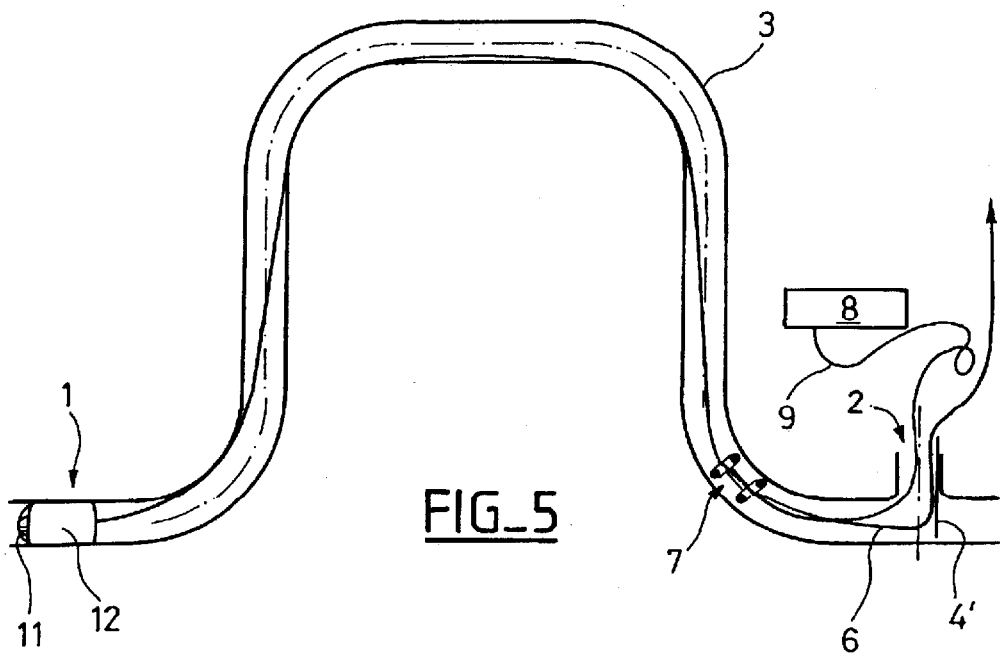
FIG_5
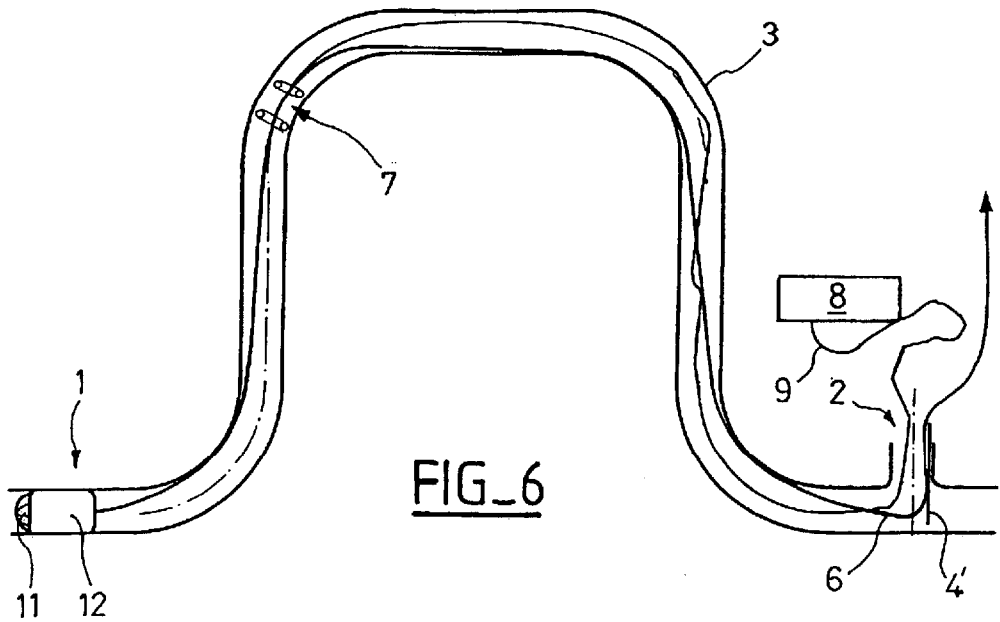
FIG_6

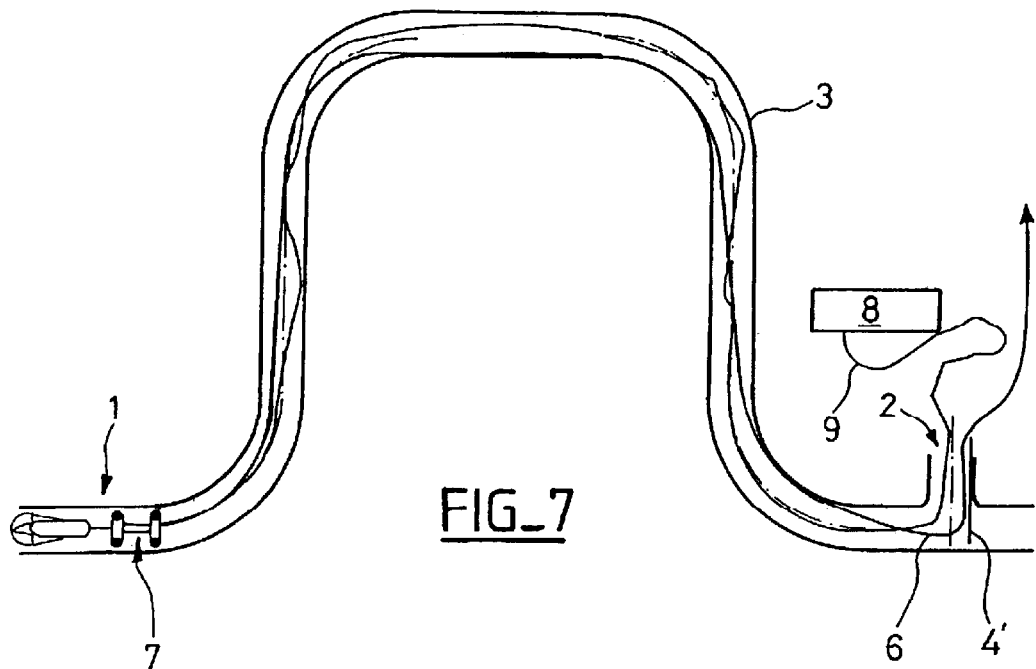
FIG_7
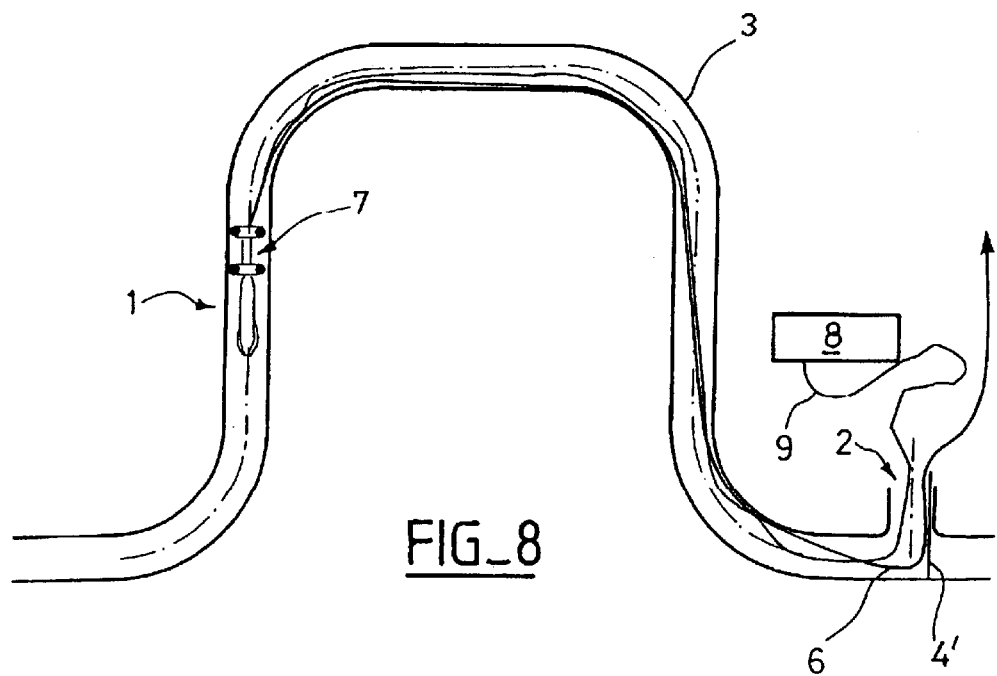
FIG_8

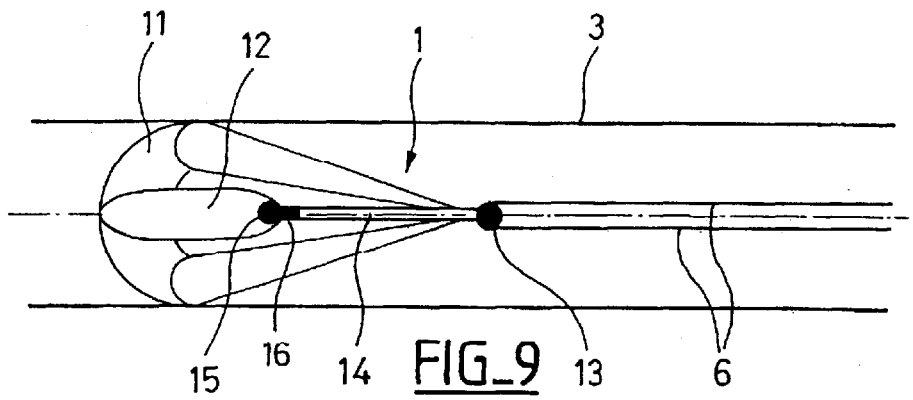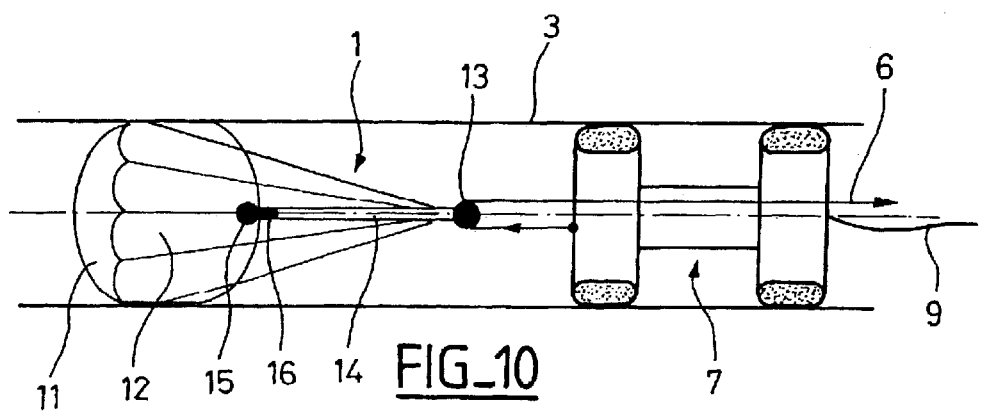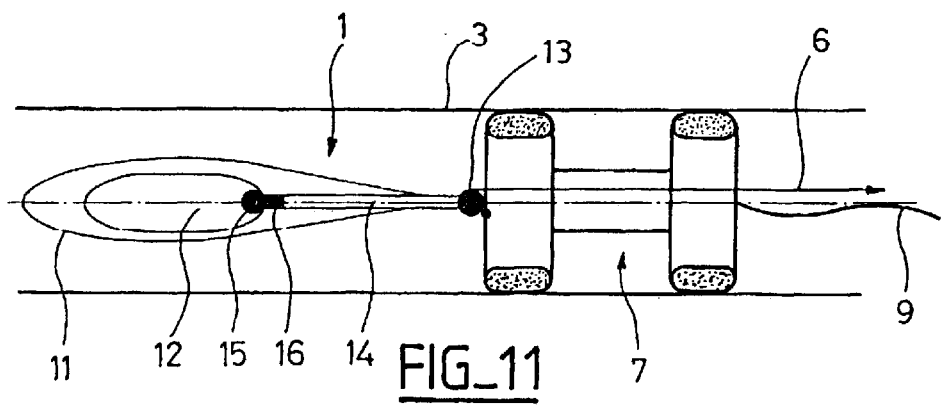

METHOD OF INSPECTING DISTRICT HEATING PIPES

BACKGROUND OF THE INVENTION

1. Field of the Invention

The invention relates to a method of inspecting district heating pipes, in particular to detect faults on the inside and outside surfaces or in the thickness of the pipes, for example. The faults to be detected can be areas with serious corrosion or cracks, for example. This kind of inspection necessitates a shut-down in order to insert a sensor and to move it along the pipe to be inspected, which is often buried. The sensor—or probe—is generally an Eddy current sensor or a video camera permanently connected to the exterior of the pipe by a data transmission cable for acquiring and/or recording information relating to the inspection. An operator on the surface can thus check the state of the pipe as the sensor moves forward. The invention can also be adapted to suit other pipe inspection methods.

2. Description of the Prior Art

Many techniques are currently used to move the sensor in the pipe. One technique consists of mounting the sensor on a support and propelling it by injecting compressed air into the pipe. This technique requires a high compressed air flowrate because the outside diameter of the support is substantially less than the inside diameter of the pipe. This difference in diameters is essential for adaptation to variations in the inside diameter of the pipe. It nevertheless remains relatively difficult to pass the sensor around bends or junctions in the pipe, and the sensor may become jammed, which necessitates opening the pipe to extract it.

Another technique consists of mounting the sensor in a motorized vehicle, known as a "crawler", which is introduced into the pipe and moves along it. This kind of vehicle has to carry a high load because it includes a drive system. Also, in order to maintain the sensor that it carries substantially centered relative to the pipe, the vehicle must be able to adapt dynamically to variations in the diameter of the pipe. A motorized vehicle of this kind generally has high development and fabrication costs, requires complex maintenance, and has unsatisfactory service life and reliability.

The object of the invention is to remedy these drawbacks by proposing a method of moving a sensor in a pipe with no risk of jamming and at competitive cost.

SUMMARY OF THE INVENTION

To this end, the invention consists of a method of inspecting district heating pipes using a sensor, which method comprises:

introducing a vehicle into the pipe, the vehicle including an uninflated balloon and a pulley in which a cable is inserted;

immobilizing the vehicle in the pipe by inflating the balloon; and moving the sensor in the pipe by fixing it to one end of the cable and pulling on the other end of the cable to move the sensor toward the immobilized vehicle in order to inspect the pipe;

and in which the vehicle includes a parachute and is propelled in the pipe by introducing into the pipe a fluid under pressure that acts on the parachute, the balloon is deflated when the sensor reaches the vehicle immobilized in the pipe, and the vehicle and the sensor are withdrawn from the pipe by pulling on the end of the cable so that the inspection is carried out during the return travel of the vehicle and the sensor.

With the above method the inspection can be carried out from only one end of the pipe. Also, the mass of the vehicle that is moved by the pressurized fluid is very low and this reduces the risk of jamming in the pipe. The parachute is flexible and adapts continuously to the diameter of the pipe, which makes propulsion by the pressurized fluid more efficient. The balloon is advantageously deflated when the sensor reaches the vehicle immobilized in the pipe, after which the vehicle and the sensor are withdrawn from the pipe by pulling on the end of the cable, and the inspection is carried out during the return travel of the vehicle and the sensor. The ends of the cable can remain outside the pipe during the propulsion of the vehicle to inflate the balloon to immobilize the vehicle when the cable is pulled tight. Carrying out the inspection in this way, during the return travel of the sensor, provides better control of the speed of the sensor, and the length of pipe inspected corresponds to the length of cable introduced into the pipe with the vehicle before pressurizing the pipe.

The invention also relates to a vehicle for implementing the inspection method. The vehicle includes a parachute adapted to be moved in the pipe by a pressurized fluid, an inflatable balloon fixed to the parachute and adapted to be inflated to immobilize the vehicle in the pipe, a pulley adapted to receive a cable to which the sensor is fixed in order to move the sensor in the pipe by pulling on the cable when the vehicle is immobilized in the pipe, and a valve for deflating the balloon including a mechanical actuator which initiates deflation of the balloon when the sensor comes into contact with the vehicle. The vehicle forms a compact and lightweight assembly consisting of simple components and can therefore be manufactured at low cost.

The vehicle advantageously further includes a cartridge of pressurized gas with a trigger adapted to inflate the balloon when the cable is pulled tight and a valve for deflating the balloon including a mechanical trigger. In this way the vehicle is automatically immobilized to form an anchorage as soon as it has traveled a predetermined distance in the pipe.

The invention is described in more detail next with reference to the accompanying drawings, which show an embodiment of the invention by way of non-limiting example.

BRIEF DESCRIPTION OF THE DRAWINGS

FIG. 1 is a diagrammatic representation of the method according to the invention during the phase of propulsion of the vehicle in a pipe forming a lyre.

FIG. 2 is a diagrammatic representation of the method when the cable is pulled before the vehicle is immobilized.

FIG. 3 is a diagrammatic representation of the method when the cable is pulled tight and shows the vehicle immobilized in the pipe.

FIG. 4 is a diagrammatic representation of the method during insertion of the sensor into the opening in the pipe.

FIG. 5 is a diagrammatic representation of the method when the sensor is being moved inside the pipe.

FIG. 6 is another diagrammatic representation of the method when the sensor is being moved inside the pipe.

FIG. 7 is a representation of the method when the sensor has reached the vehicle and the balloon is deflated.

FIG. 8 is a diagrammatic representation of the method during the return travel of the sensor and the vehicle to the opening in the pipe.

FIG. 9 is a diagrammatic representation of the vehicle according to the invention when it is being propelled by a pressurized fluid.

FIG. 10 is a diagrammatic representation of the vehicle according to the invention with its balloon inflated to immobilize it in the pipe.

FIG. 11 is a diagrammatic representation of the vehicle according to the invention with its balloon deflated to return it to the opening in the pipe.

DETAILED DESCRIPTION OF THE PREFERRED EMBODIMENT

The method in accordance with the invention is intended in particular for inspecting the state of a district heating pipe 3 by means of a vehicle 1 introduced through an opening 2 in the pipe. The pipe can be that shown diagrammatically in FIGS. 1 to 8, for example, which is a thermal expansion lyre including four ninety degree bends, substantially forming a U-shape.

In accordance with the invention, a vehicle 1 is inserted through an opening 2 in the pipe 3 to be propelled by a pressurized fluid so that it travels a predetermined distance in the pipe to be inspected, as shown in FIGS. 1 and 2. The vehicle is then immobilized in the pipe 3 to form an anchor point, as shown in FIG. 3, for pulling the sensor until it reaches the immobilized vehicle, as shown in FIGS. 4 to 7. The pipe can be inspected when the sensor reaches the immobilized vehicle or during the return travel of the sensor and the vehicle out of the pipe. In either case, the method enables the pipe to be inspected with access thereto from one end only.

The vehicle includes a parachute 11 fixed to a balloon 12 which is initially uninflated when it is inserted into the opening 2. After inserting the vehicle, a connecting flange 4 or collar is fitted between the opening 2 and a compressor 5 to pressurize the pipe to propel the vehicle 1 by means of its parachute 11. The compressor 5 can be an air compressor, for example, of sufficient power to produce a flow of compressed air in the pipe. In this example, the opening 2 is a junction in the pipe 3, but the method applies equally well to other types of opening, for example an opening forming a straight section and resulting from cutting the pipe to be inspected. As shown in FIGS. 2 and 3, a flap 4' is mounted in the branch on the side of the portion of pipe that is not inspected. The flap 4' is intended to prevent the uninspected part of the pipe from being pressurized by the compressor when propelling the parachute.

The balloon 12 is connected to the opening in the pipe or to the flange 4 by a cable 6, a particular length of which is introduced into the pipe with the vehicle 1. The travel of the vehicle is thus limited to the length of the cable 6. To reduce the friction due to the cable sliding along the pipe, the cable is a steel cable with a PTFE jacket, for example (other materials such as kevlar and other configurations could also be used). To be more specific, the cable 6 is fed through a pulley fixed to the balloon 12 so that two runs of the cable 6 are inside the pipe during propulsion of the vehicle 1 and two ends of the cable remain outside the pipe. The free cable is advantageously coiled up on the vehicle 1. As shown in FIGS. 2 and 3, the flange 4 is adapted to hold the ends of the cable 6 out of the pressurized area of the pipe 3 and to immobilize them. Using a parachute consisting mainly of a flexible canopy forms a vehicle capable of adapting continuously to variations in the pipe diameter and of passing round the bends in the lyre without risk of jamming.

According to the invention, the vehicle is immobilized in the pipe by inflating the balloon. For example, the balloon can be inflated when the cable 6 is pulled tight between the balloon 12 and the flange 4. The pipe 3 is then depressurized and the balloon 12 inflated to immobilize the vehicle 1 at its end of travel position so that it forms an anchor point for subsequently hauling a sensor. After depressurization, the flange 4 is removed to insert a sensor 7 via the opening 2. The sensor is fixed to the first end of the cable 6, as shown diagrammatically in FIG. 4. In the example of Eddy current inspection, the sensor takes the general form of a coil, with a substantially cylindrical body of small diameter having a coaxial ring at each end with a diameter slightly less than the inside diameter of the pipe. Thus the sensor 7 has a large diameter at each end and a small diameter between its ends, which facilitates its movement around the bends of the pipe. Each ring can be fitted with a peripheral brush to keep the sensor substantially centered in the pipe, despite its diameter variations. The body advantageously includes a cable passage and an attachment point so that the cable 6 passes through the sensor and is free to slide relative to it. Thanks to the cable passage, friction between the cable and the pipe is further reduced to facilitate forward movement of the sensor in the pipe as it approaches the immobilized vehicle.

Pulling the second end of the cable 6 moves the sensor 7 until it reaches the vehicle 1 immobilized inside the pipe 3, as shown diagrammatically in FIGS. 5 and 6. As soon as the sensor reaches the vehicle 1, the balloon 12 is deflated to release the vehicle 1, in a step corresponding to FIG. 7. After the vehicle is released, the combination of the vehicle and the sensor is returned to the opening in the pipe by pulling on the second end of the cable 6, as shown in FIG. 8. The pipe can advantageously be inspected by the sensor during this return travel, during which friction between the cable 6 and the pipe 3 is reduced because there is only one run of the cable 6 in the pipe. The speed can therefore be better controlled and maintained substantially constant, to optimize the operating conditions of the sensor. During the return travel of the sensor, the inspection data is transmitted to an analyzer and/or recorder system 8 via a data transmission cable 9 connecting the sensor to the analyzer system. The data transmission cable 9 is introduced into the pipe with the sensor, as shown in FIGS. 4 to 7.

The invention also relates to a vehicle for implementing the above inspection method. According to the invention, the vehicle 1 includes a parachute 11, to which is fixed the inflatable balloon 12, and a pulley 13 which is fixed to the inflatable balloon 12, as shown in FIG. 9. The parachute can have a canopy having an outside diameter substantially greater than the nominal diameter of the pipe. The canopy is advantageously mounted on a flexible structure such as a plurality of flexible blades or ribs adapted to hold the perimeter of the canopy pressed against the inside surface of the pipe 3. The structure can be arranged like the ribs of an umbrella, for example, or take the form of a ring fixed to the periphery of the canopy.

In particular, using a structure of the above kind, which tends to form a maximum seal between the parachute and the pipe, improves the efficiency of propulsion and reduces the consumption of air, so that the rating of the compressor 5 can be reduced. The perimeter of the canopy can advantageously incorporate a peripheral neoprene seal to optimize friction against the pipe. The payload of the balloon and the parachute is made as small as possible to improve the efficiency of propulsion by the flow of air. The structure can be collapsible so that the parachute can be closed when the balloon is deflated to restrict the resistance to movement of the vehicle during the return travel of the vehicle and sensor combination to the opening in the pipe.

The inflatable balloon is advantageously located inside the bell formed by the parachute 11 to form a compact assembly. In the example shown in FIG. 9, the uninflated balloon is substantially cylindrical with one end fixed to the center of the bell formed by the parachute 11 and its other end attached to an arm 14. The balloon has a diameter when inflated greater than the section of the pipe, to guarantee satisfactory immobilization of the vehicle in the pipe, as shown diagrammatically in FIG. 10. For example, the size of the balloon 12 is chosen to immobilize the vehicle in the pipe without slipping and capable of opposing a traction force in the arm 14 equal to at least twice the maximum traction force necessary to haul the sensor 7.

When the vehicle as a whole is inside a pipe 3, the arm 14 is parallel to the pipe and has the pulley 13 fixed to its free end. As shown diagrammatically in FIGS. 9 to 11, the balloon includes a pressurized cartridge 15 for inflating the balloon when the vehicle reaches the end of its travel in the pipe, i.e. when the cable 6 is pulled tight. Inflation of the balloon 12 can be remote controlled via a radio link or an electrical cable connecting the vehicle to the exterior of the pipe, for example.

In a preferred embodiment, the inflation cartridge 15 is connected to a trigger 16 which in this example is mounted between the arm 14 and the balloon 12.

For example, the trigger can be actuated by pulling on an auxiliary trigger cable dedicated to inflating the balloon. In the example shown in the figures, the cable 6 for hauling the sensor 7 triggers inflation of the balloon. To be more specific, the trigger 16 opens the gas cartridge when the force applied to the arm 14 is above a threshold value corresponding to the cable 6 being pulled tight. With this arrangement, the vehicle is automatically immobilized when it reaches the end of its travel, and it is therefore unnecessary to provide a control device with triggering by an operator. The trigger 16 can be a membrane which is broken to open the gas cartridge when a force greater than a threshold value is applied to it, for example. Other types of trigger 16 can be envisaged without departing from the scope of the invention, for example a strain gauge device or an accelerometer.

The balloon is deflated when the sensor 7 reaches the vehicle in the pipe 3, as shown in FIG. 11, for example in response to the force applied to the arm 14 crossing another threshold value, which in this case is higher than the inflation threshold, to correspond to a high traction force applied to the cable 6 when the sensor 7 comes into contact with the pulley 13 when the vehicle 1 is still immobilized in the pipe.

In a preferred embodiment of the vehicle according to the invention the balloon includes a deflation valve with a mechanical actuator (not shown) near the pulley 13 so that the sensor 7 coming into contact with the actuator deflates the balloon 12 by opening the valve.

A safety system with a time-delay can also be associated with the system for deflating the balloon. A timer deflates the balloon automatically if the usual commands have not achieved this. The timer is set according to the normal duration of the inspection procedure as a whole.

What is claimed is:

1. A method of inspecting district heating pipes using a sensor, said method comprising:
   introducing a vehicle into said pipe, said vehicle including an uninflated balloon and a pulley in which a cable is inserted;
   immobilizing said vehicle in said pipe by inflating said balloon; and
   moving said sensor in said pipe by fixing it to one end of said cable and pulling on the other end of said cable to move said sensor toward said immobilized vehicle in order to inspect said pipe,
   wherein said vehicle includes a parachute and is propelled in said pipe by introducing into said pipe a fluid under pressure that acts on said parachute, said balloon is deflated when said sensor reaches said vehicle immobilized in said pipe, and said vehicle and said sensor are withdrawn from said pipe by pulling on the end of said cable so that the inspection is carried out during the return travel of said vehicle and said sensor.

2. The inspection method claimed in claim 1, wherein said ends of said cable are kept out of said pipe during said propulsion of said vehicle and said balloon is inflated to immobilize said vehicle when said cable is pulled tight.

3. The inspection method claimed in claim 1, wherein said balloon is inflated to immobilize said vehicle when said balloon receives an electrical signal.

4. The inspection method claimed in claim 1, wherein said balloon is inflated to immobilize said vehicle when said balloon receives a radio signal.

5. A vehicle for inspecting a district heating pipe using a sensor, said vehicle comprising a parachute adapted to be moved in said pipe by a pressurized fluid, an inflatable balloon adapted to be inflated to immobilize said vehicle in said pipe, and a pulley adapted to receive a cable to which said sensor is fixed in order to move said sensor in said pipe by pulling on said cable when said vehicle is immobilized in said pipe,
   and a valve for deflating said balloon including a mechanical actuator which initiates deflation of said balloon when the sensor comes into contact with said vehicle.

6. The vehicle claimed in claim 5, including a cartridge of pressurized gas connected to said balloon and a trigger adapted to be activated by pulling a cable.

7. The vehicle claimed in claim 6, wherein said cable for actuating said trigger is said cable that is inserted in said pulley.

8. The vehicle claimed in claim 5, wherein said parachute includes a canopy mounted on a flexible structure adapted to maintain the perimeter of said canopy pressed against the inside surface of said pipe.

9. The vehicle claimed in claim 8, wherein said flexible structure is adapted to be folded.

10. The vehicle claimed in claim 8, wherein said perimeter of said canopy comprises a neoprene seal.

11. The vehicle claimed in claim 5, including a cartridge of pressurized gas connected to said balloon that is activated to inflate said balloon by an electrical signal.

12. The vehicle claimed in claim 5, including a cartridge of pressurized gas connected to said balloon that is activated to inflate said balloon by a radio signal.

13. The vehicle claimed in claim 5, wherein said sensor comprises a ring attached at each end, and a peripheral brush affixed to each ring.

14. The vehicle claimed in claim 5, wherein said sensor comprises an internal cable passage for said cable.

15. The vehicle claimed in claim 5, wherein said sensor comprises a data transmission cable.

16. The vehicle claimed in claim 5, wherein said vehicle further comprises a timer to automatically deflate the balloon.

* * * * *